Oct. 28, 1941.    L. B. OVENHOUSE    2,260,637
AUTOMATIC HYDRAULIC BRAKE FOR TRAILERS
Filed Feb. 19, 1941    2 Sheets-Sheet 1

Inventor

Leroy B. Ovenhouse

By  Clarence A. O'Brien

Attorney

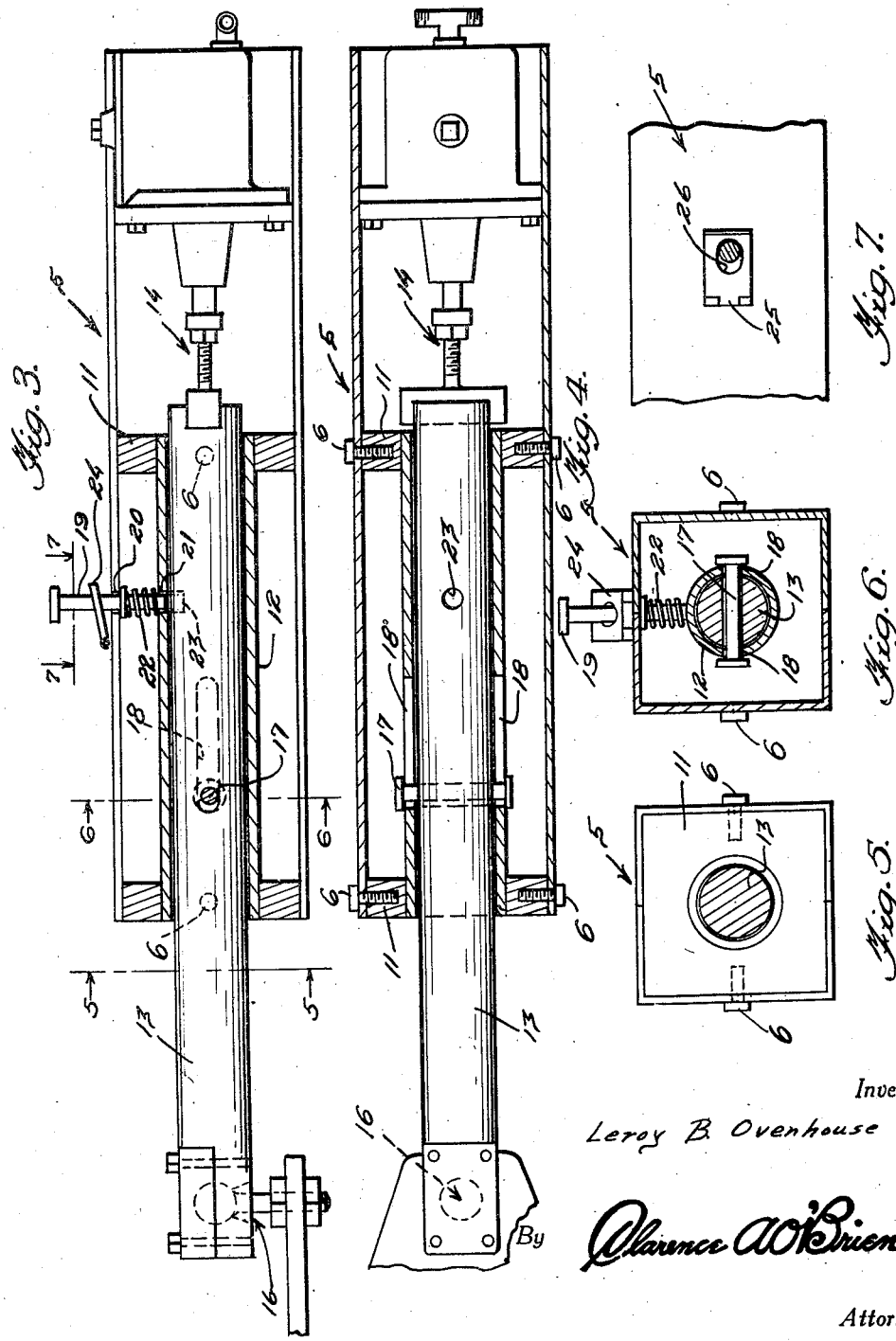

Patented Oct. 28, 1941

2,260,637

UNITED STATES PATENT OFFICE 2,260,637

AUTOMATIC HYDRAULIC BRAKE FOR TRAILERS

Leroy B. Ovenhouse, Tampa, Fla.

Application February 19, 1941, Serial No. 379,666

3 Claims. (Cl. 188—142)

This invention relates particularly to automatic brake applying mechanisms adapted for applying the brakes of a trailer vehicle incidental to the application of the brakes of the lead vehicle.

In accordance with the present invention a device is provided which will serve the function of a hitch for connecting the draft and trailer vehicles in addition to providing for the automatic application of the brakes of the trailer vehicle incidental to any attempt of the trailer vehicle to run onto or overtake the draft vehicle.

The invention together with its objects and advantages will be best understood from a study of the following description taken in connection with the accompanying drawings wherein:

Figure 3 is an enlarged detail view of the device, with certain parts shown in section and other parts in elevation.

Figure 4 is a horizontal detail view with certain parts shown in section and other parts in elevation.

Figures 5 and 6 are transverse sectional views taken substantially on the line 5—5 and 6—6 respectively of Figure 3 and Figure 7 is a detail sectional view taken substantially on the line 7—7 of Figure 3.

Referring more in detail to the drawings it will be seen that in the preferred embodiment thereof the device comprises a tubular casing 5 that is preferably composed of two complemental half sections, channel-shape in cross section, and detachably secured together through the medium of bolts or other fastening elements 6 that thread into the spacer blocks 11 at opposite sides of the casing as shown to advantage in Figures 3 and 5.

Figure 1:
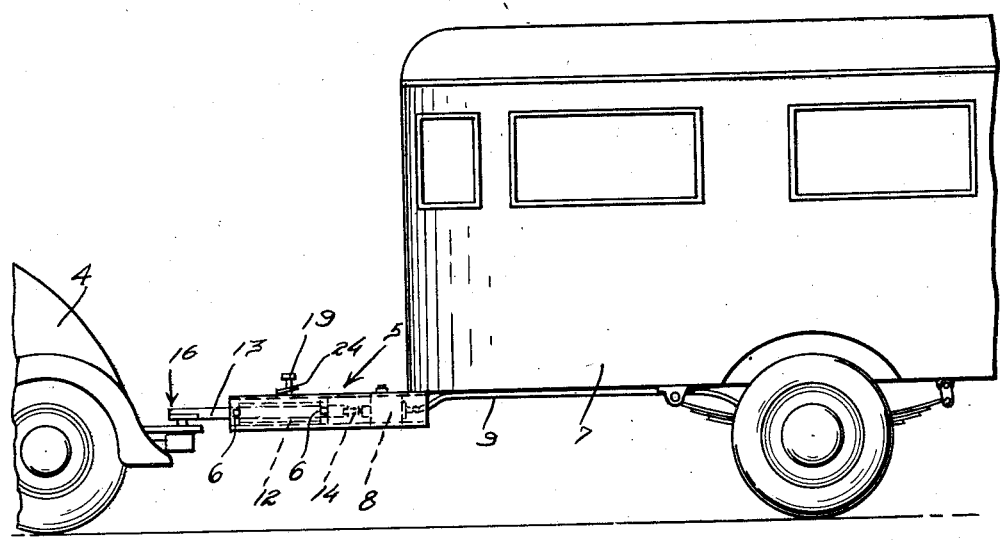
Figure 1 is a side elevational view illustrating the application of the invention.
Figure 2:
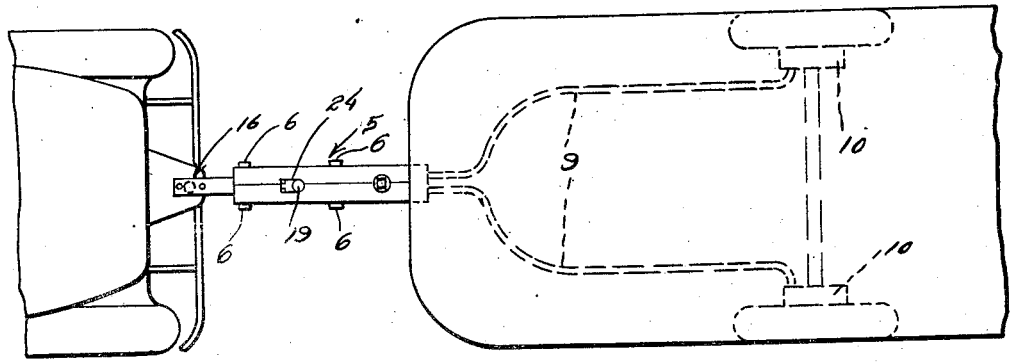
Figure 2 is a top plan view.

At one end thereof the casing is adapted to be mounted on the trailer vehicle 7, and confined within one end of the casing 5 is the master cylinder 8 of an hydraulic brake mechanism for the trailer vehicle 7, and which mechanism also includes conduits 9—9 that serve to connect the master cylinder 8 with the wheel brakes 10 as clearly shown in Figure 2.

Mounted within the casing 5 and supported by the spacer blocks 11—11 secured within the casing 5 through the medium of the aforementioned attaching elements 6 is a cylinder 12 through which extends a draft rod 13.

At one end thereof the rod 13 is suitably connected as at 14 with the piston (not shown) of the master cylinder 8, while at the relatively opposite end thereof the rod 13 is connected with the draft or lead vehicle 4 through the medium of a ball and socket joint assembly indicated generally by the reference numeral 16.

Relative movement of the casing 5 and rod 13 is limited through the medium of a transverse pin 17 carried by the rod 13 and having its opposite ends accommodated in longitudinal slots 18 provided in the cylinder 12.

In actual practice, with the vehicles moving along at a uniform rate of speed in the same direction, the automobile or draft vehicle 14 pulling the trailer 7, the rod 13, due to the drag and tendency of the trailer to pull backwardly thereon, is pulled forward in the extreme forwardmost position suggested in Figure 3. However, if the brakes are applied to the automobile 14 the relative speed of the two vehicles will change, the inertia of the trailer vehicle 7 tending to force the casing 5 and associated cylinder 12 onward toward the automobile or draft vehicle 14. When this takes place the member 13 by reason of its connection 14 with the piston of the master cylinder 8 will cause the piston to remain substantially stationary as the cylinder 8 moves relative to the piston therein with the result that a gradual application of the wheel brake of the trailer vehicle 7 takes place.

In order to permit backing or reversing direction of movement of the coupled vehicles without disconnecting the coupling therebetween, and at the same time prevent the application of the brakes of the trailer, there is provided a locking pin 19 that works through aligned openings provided at 20 in the casing 5 and at 21 in the cylinder 12 and is normally urged upwardly through the medium of a suitably provided coil spring 22 to clear a keeper socket or recess 23 provided therefor in the rod 13.

To releasably secure the pin 19 in engagement with the rod 13 there is provided a frictional keeper member 24. The member 24 is in the form of a plate pivoted as at 25 to the casing 5 and having an opening 26 that accommodates the pin 13. Obviously the frictional contact set up between the pin 19 and the plate 24 at one edge of the slot 26 will serve to hold the pin 19 in a projected position and in engagement with the socket 23 against the action of spring 22. With the locking pin 19 in the retracted position, the parts are free to shift relative to one another as herein previously explained for applying the brakes of the trailer vehicle. However with the pin 19 in a projected position, that is with the inner end thereof engaged in the socket 23 casing 5 and rod 13 are held against relative longitudinal movement and thus with the parts in the position shown in Figure 3 a reversing of the vehicle may take place without any application of the wheel brake of the trailer vehicle.

It is though that the simplicity of the device, together with its manner of operation and many advantages will be clear to those skilled in the art without further detail description.

It is also to be understood that while I have herein illustrated and described the preferred embodiment of the invention, I claim all such forms of the invention to which I am entitled in view of the prior art and scope of the appended claims.

Having thus described the invention what is claimed as new is:

1. A trailer brake operating mechanism comprising, in combination, a tubular casing adapted to be connected at one end thereof with a trailer vehicle, a brake operating element for the trailer brake system mounted in said one end of the casing, a tubular member secured longitudinally within said casing, and a hitch bar extending longitudinally through said tubular member and having one end operatively connected to said brake operating element, and the relatively opposite end thereof adapted to be connected with a draft vehicle, and interengaging means on said tubular member and on said hitch bar coacting to limit longitudinal movement of said casing and hitch bar relative to one another in either of two directions, a spring biased locking pin having a working fit through openings provided in said casing and said tubular member, and said hitch bar provided with a socket adapted to receive the inner end of said pin whereby to secure said casing and hitch bar against relative longitudinal movement, and a manually manipulative member hingedly mounted on said casing and having frictional contact with said pin to act thereon in opposition to the biasing spring to releasably secure the inner end of the pin engaged in said socket.

2. A trailer brake operating mechanism comprising, in combination, a tubular casing adapted to be connected at one end thereof with a trailer vehicle, a brake operating element for the trailer brake system mounted in said one end of the casing, a tubular member secured longitudinally within said casing, and a hitch rod extending longitudinally through said tubular member and having one end operatively connected to said brake operating element, and the relatively opposite end thereof adapted to be connected with a draft vehicle, and interengaging means on said tubular member and on said hitch rod coacting to limit longitudinal movement of said casing and hitch rod relative to one another in either of two directions, a spring biased locking pin having a working fit through openings provided in said casing and said tubular member, and said hitch rod provided with a socket adapted to receive the inner end of said pin whereby to secure said casing and hitch rod against relative longitudinal movement, and a retaining element for said pin pivoted to said casing and provided with a slot through which said pin works, said retaining element adapted to frictionally engage said pin for retaining the latter in a retracted position with respect to said hitch rod.

3. In an operating mechanism for hydraulic trailer brakes, a casing adapted to be secured at one end thereof to a trailer vehicle, a master cylinder fixedly mounted within said one end of the casing and connected with the hydraulic mechanism of the trailer brake system, a hitch rod having an end extending into said casing and operatively connected with the piston of said master cylinder, and a second end adapted to be connected with a draft vehicle whereby upon an overrunning of said trailer vehicle relative to said draft vehicle the piston of said master cylinder will be actuated for placing the trailer brake operating system in operation for applying the brakes of the trailer, coacting means associated with said casing and said hitch rod for limiting relative movement of the casing and hitch rod longitudinally in either direction, and manipulative means coacting with said casing and said hitch rod to secure said rod and casing in fixed position to one another thereby to permit reversing of the vehicles without untoward application of the brakes of the trailer vehicle, said manipulative means a spring biased locking element normally urged to a released positon, and a retaining element having frictional contact with said locking element for releasably securing the same in a locking position.

LEROY B. OVENHOUSE.